(12) United States Patent  
Kwolek

(10) Patent No.: US 8,414,048 B1  
(45) Date of Patent: Apr. 9, 2013

(54) VEHICLE INTERIOR ASSEMBLY

(75) Inventor: Chad Kwolek, Hartland, MI (US)

(73) Assignee: Nissan North America, Inc., Franklin, TN (US)

( * ) Notice: Subject to any disclaimer, the term of this patent is extended or adjusted under 35 U.S.C. 154(b) by 74 days.

(21) Appl. No.: 13/278,845

(22) Filed: Oct. 21, 2011

(51) Int. Cl.
*B60R 13/02* (2006.01)

(52) U.S. Cl.
USPC .......... 296/24.34; 296/191; 296/1.08; 296/29

(58) Field of Classification Search .............. 296/24.34, 296/191, 1.08, 70, 29, 187.05, 146.7
See application file for complete search history.

(56) References Cited

U.S. PATENT DOCUMENTS

| | | | | |
|---|---|---|---|---|
| 7,802,831 | B2 * | 9/2010 | Isayama et al. | 296/24.34 |
| 2008/0001422 | A1 * | 1/2008 | Kwolek | 296/24.34 |
| 2009/0179448 | A1 * | 7/2009 | Lota et al. | 296/24.34 |
| 2009/0179458 | A1 * | 7/2009 | Miki | 296/191 |
| 2012/0187707 | A1 * | 7/2012 | Kwolek | 296/1.08 |
| 2012/0200105 | A1 * | 8/2012 | Vasko et al. | 296/24.34 |

OTHER PUBLICATIONS

U.S. Appl. No. 13/014,364, Kwolek.
U.S. Appl. No. 13/020,199, Vasko et al.

* cited by examiner

*Primary Examiner* — Jason S Morrow
(74) *Attorney, Agent, or Firm* — Global IP Counselors, LLP

(57) ABSTRACT

A vehicle interior assembly includes a main body, a side trim panel and a fastener part. The main body has a side surface through which a slot is defined and a top surface through which a fastener receiving aperture is defined. The fastener receiving aperture extends through the top surface to an inner cavity of the main body that is accessible through the slot. The side trim panel at least partially covers the side surface of the main body. The side trim panel has a projection that extends away from an inner surface of the side trim panel into the slot defined by the side surface. The fastener part extends through the fastener receiving aperture defined by the top surface and engages the projection to fixedly couple the side trim panel to the main body.

20 Claims, 13 Drawing Sheets

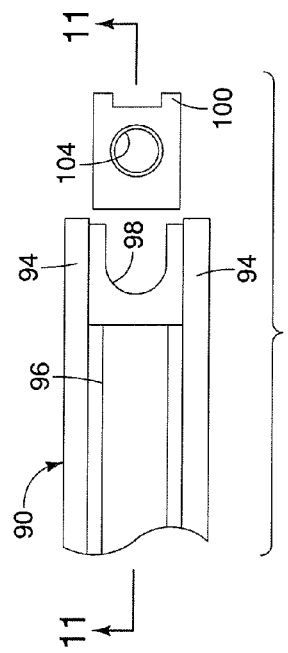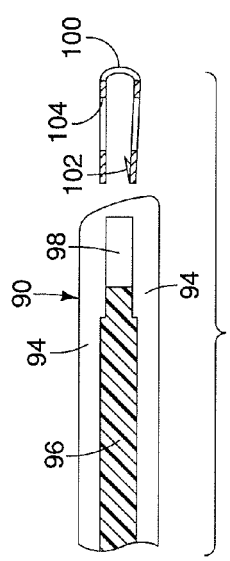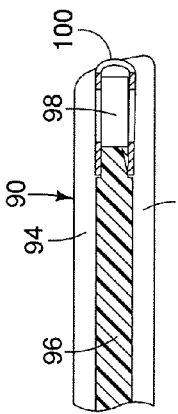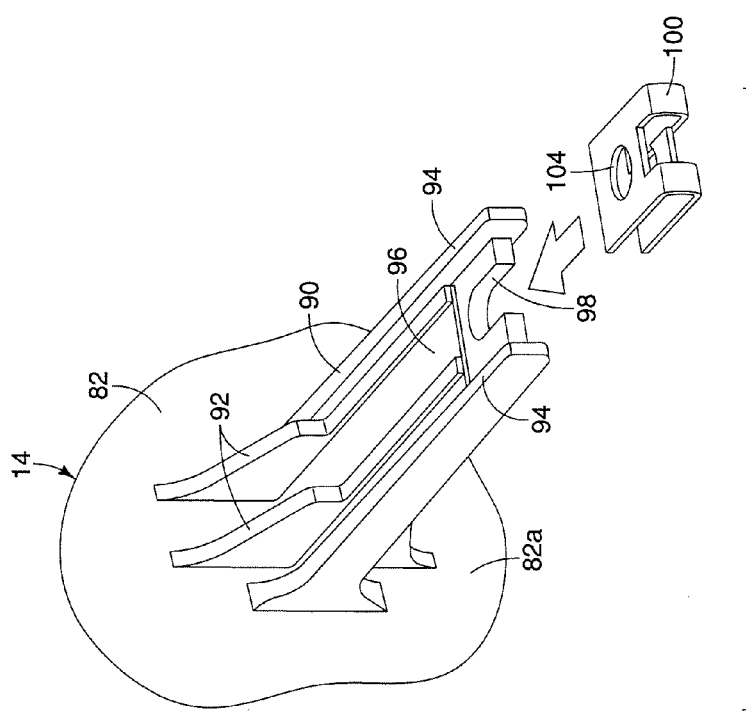

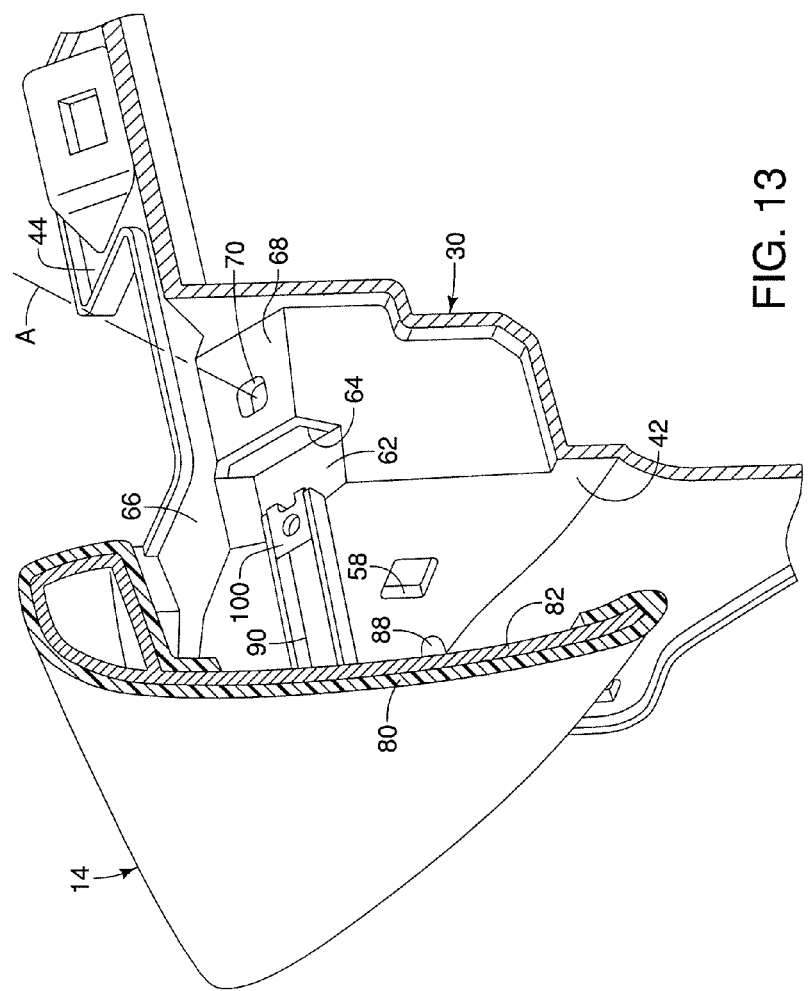

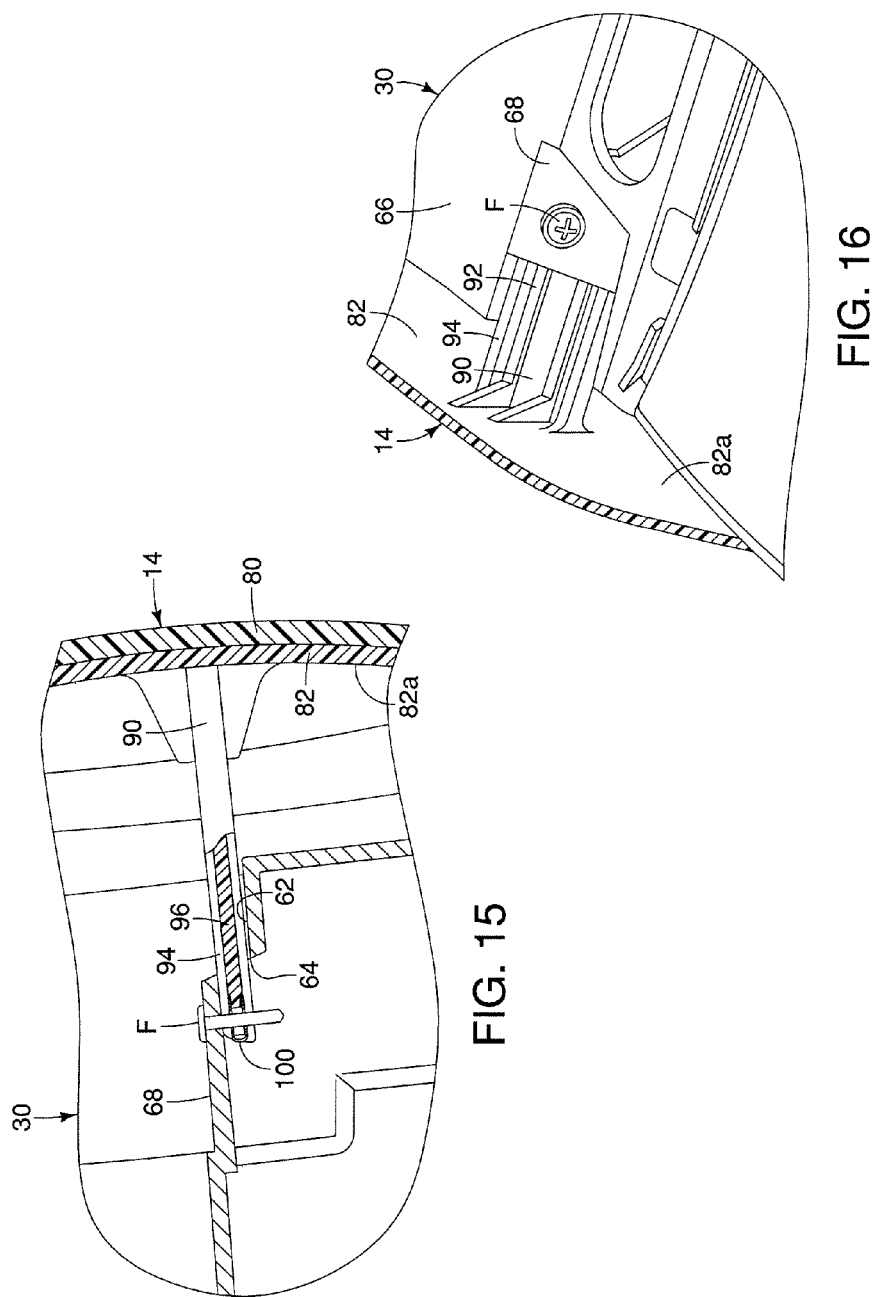

VEHICLE INTERIOR ASSEMBLY

BACKGROUND

1. Field of the Invention

The present invention generally relates to a vehicle interior assembly. More specifically, the present invention relates to a vehicle interior assembly that includes a side trim panel with an angularly offset mounting projection.

2. Background Information

Vehicle passenger compartments typically include interior structures such as center consoles. Center consoles are increasingly being designed to include a variety of features, such as control panels and storage compartments. This trend inherently results in increased occupant interaction with the different center console features, which increases the risk of panels or other interior trim components inadvertently becoming dislodged or removed during normal vehicle operation. Further, center consoles are often designed to extend at least partially under dashboards or instrument panels within the passenger compartments of vehicles, which can reduce clearance space for accessing compartments and generally increase occupant contact with center console trim components.

SUMMARY

It is an object of the present invention to provide an interior assembly that can be installed within a vehicle without interference from an instrument panel that is already in place.

Another object of the invention is to provide an interior assembly with a side panel that remains rigidly secured to the interior assembly.

In view of the state of the known technology, one aspect of the present disclosure is to provide a vehicle interior assembly with a main body, a side trim panel and a fastener part. The main body has a side surface through which a slot is defined and a top surface through which a fastener receiving aperture is defined. The fastener receiving aperture extends through the top surface to an inner cavity of the main body that is accessible through the slot. The side trim panel at least partially covers the side surface of the main body. The side trim panel has a projection that extends away from an inner surface of the side trim panel into the slot defined by the side surface. The fastener part extends through the fastener receiving aperture defined by the top surface and engages the projection to fixedly couple the side trim panel to the main body.

BRIEF DESCRIPTION OF THE DRAWINGS

Referring now to the attached drawings which form a part of this original disclosure:

FIG. 9 is an exploded perspective view of the projection including a fastening clip that attaches to the projection in accordance with one embodiment;

FIG. 10 is a top exploded view of the projection and the fastening clip in accordance with one embodiment;

FIG. 11 is a side cross-sectional view of the projection taken along the line 11-11 in FIG. 10 showing the fastening clip removed from the projection in accordance with one embodiment;

FIG. 12 is another side cross-sectional view of the projection similar to FIG. 12, showing the fastening clip attached to the projection in accordance with one embodiment;

FIG. 13 is a perspective cross-sectional view of the main body and one of the side trim panels of the center console taken along the line 13-13 in FIG. 3, showing the projection just prior to insertion into the slot of the main body in accordance with one embodiment;

FIG. 15 is another cross sectional view of the main body and the side trim panel of the center console taken along the line 15-15 in FIG. 3, showing the projection fully inserted into the slot of the main body with a fastener extending through an aperture in the main body adjacent to the slot in accordance with one embodiment;

FIG. 16 is a perspective view of an upper portion of the center console partially assembled showing a head of the fastener installed in the aperture of the main body in accordance with one embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
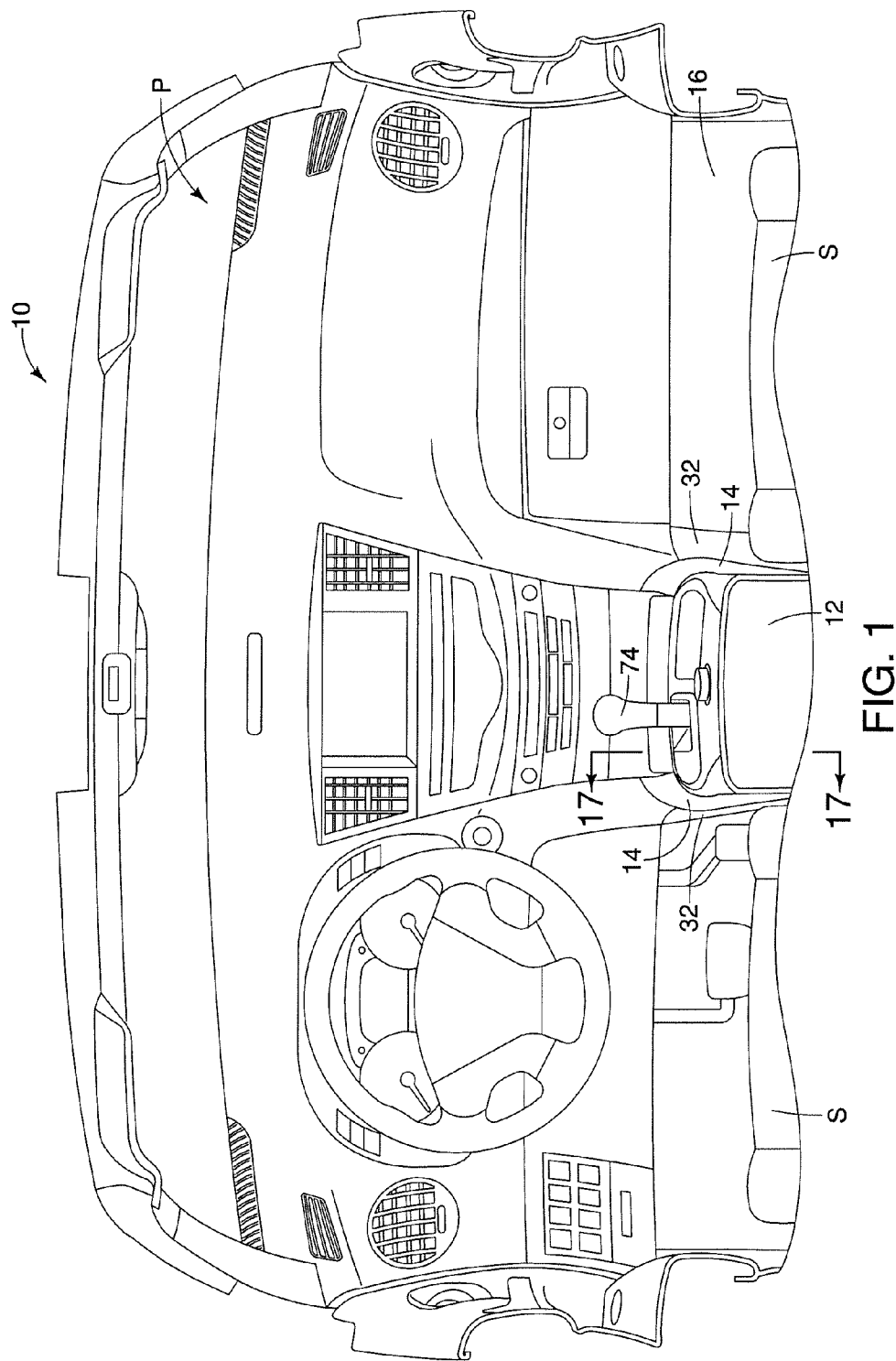
FIG. 1 is a perspective view of a vehicle passenger compartment showing an instrument panel, seats and a center console (a vehicle interior assembly) that extends between the seats in accordance with one embodiment.

Referring initially to FIG. 1, a vehicle 10 is illustrated in accordance with a first embodiment. The vehicle 10 includes a center console 12 with side trim panels 14, as is described in greater detail below.

Figure 2:
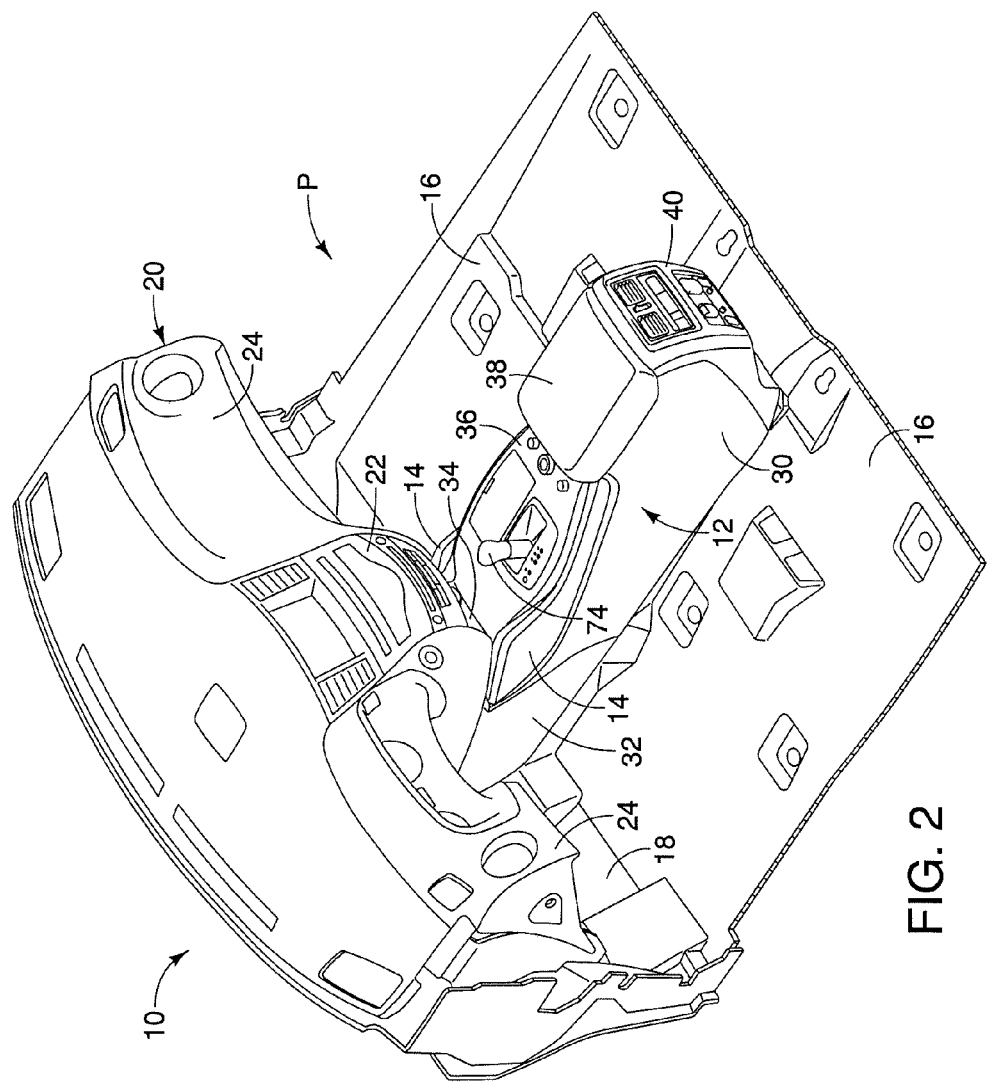
FIG. 2 is another perspective view of the passenger compartment with the seats removed, revealing a front section of the center console extending under the instrument panel in accordance with one embodiment.
Figure 3:
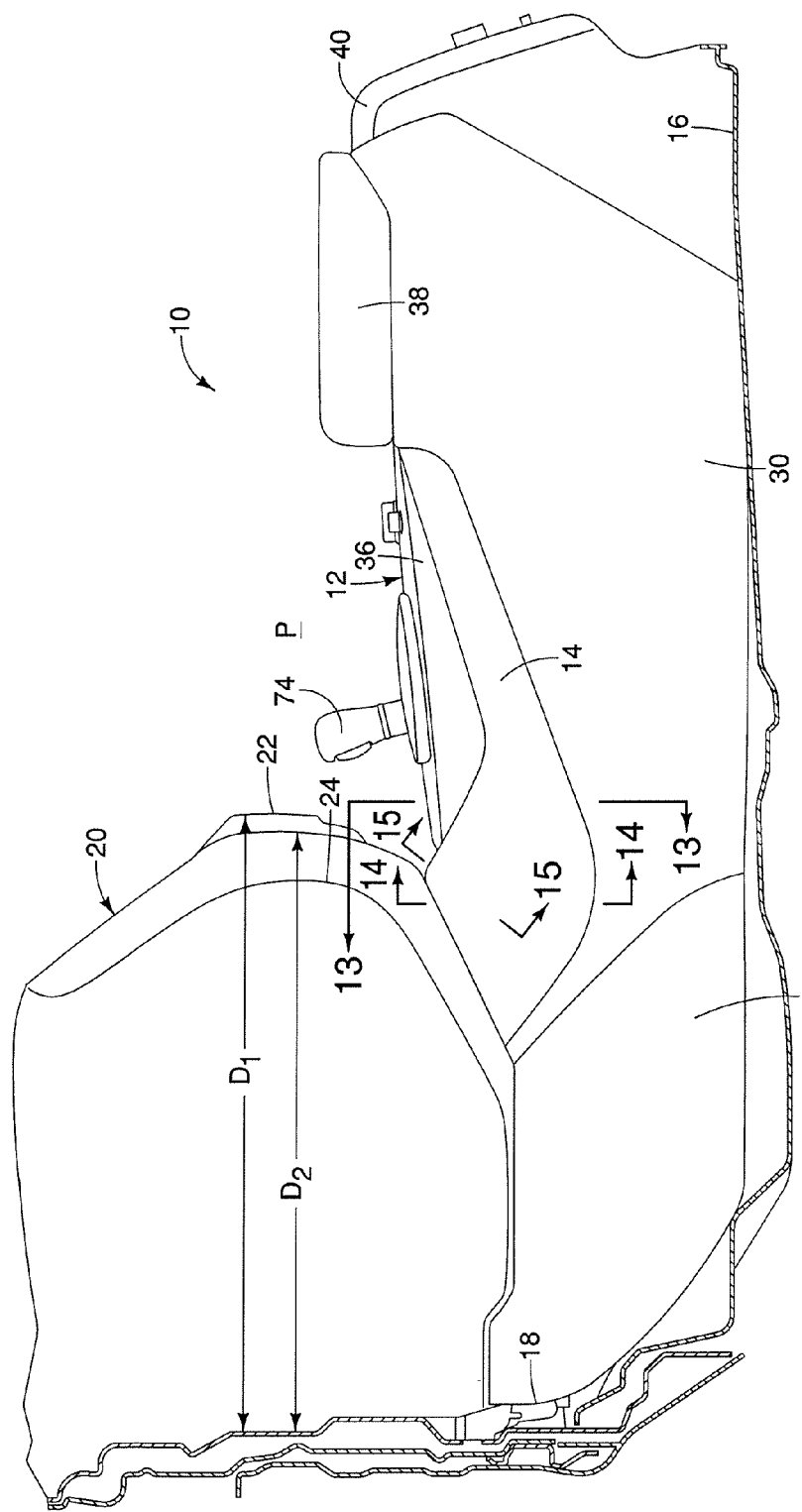
FIG. 3 a side elevation of the center console and the instrument panel showing one of a pair of side trim panels attached to the center console in accordance with one embodiment.
Figure 4:
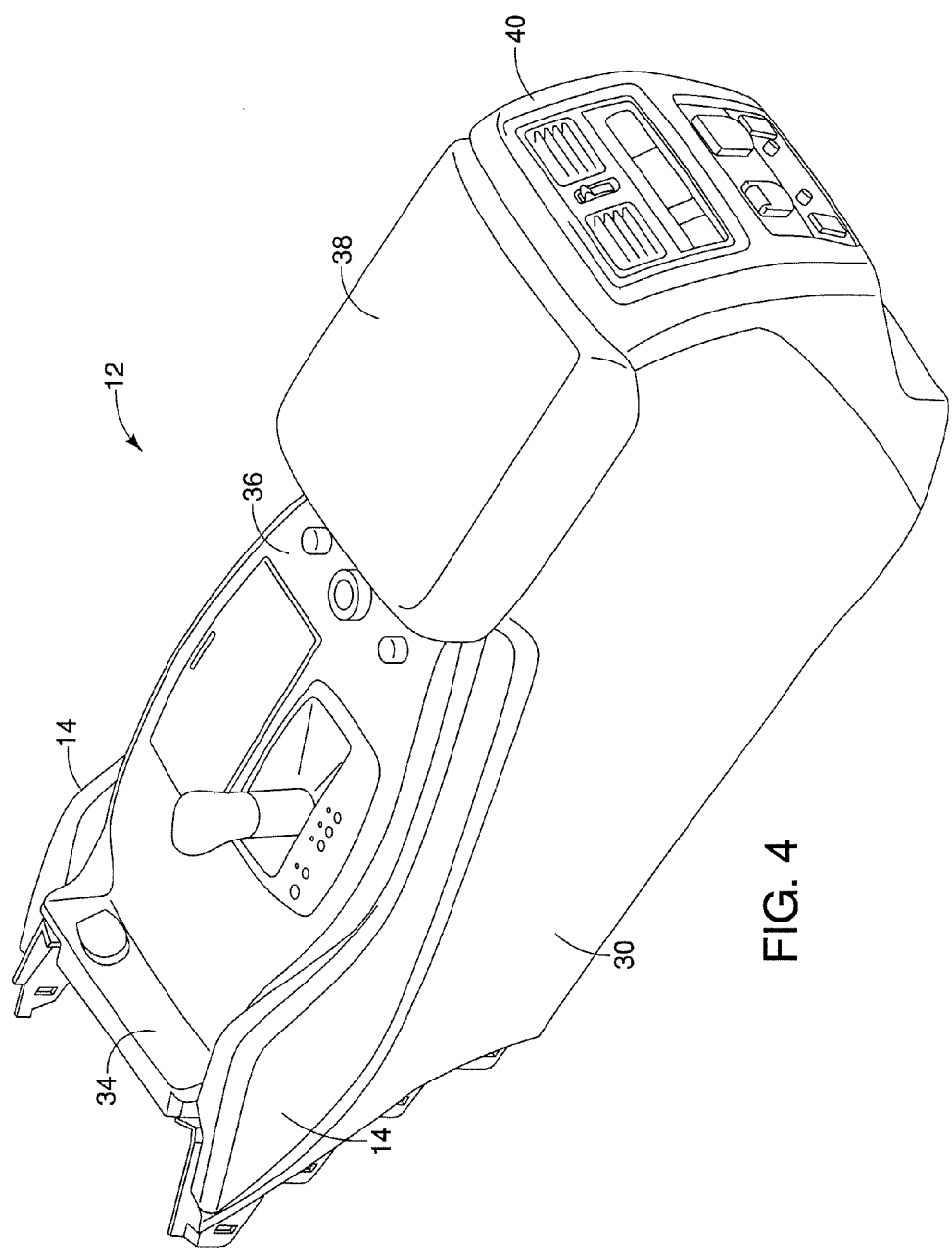
FIG. 4 is a perspective view of the center console shown removed from the vehicle in accordance with one embodiment.

As shown in FIGS. 2 and 3, the vehicle 10 includes a floor 16, an upright dash wall 18, an instrument panel 20, front seats S (shown only in FIG. 1) and the center console 12. The floor 16 and the dash wall 18 (an upright dash wall) at least partially define a passenger compartment P of the vehicle 10. The dash wall 18 extends upward from a front edge of the floor 16 and separates an engine compartment (not shown) of the vehicle 10 from the passenger compartment P. The seats S are preferably secured to the floor 16 by fasteners (not shown) within the passenger compartment P in a conventional manner. The left side of FIG. 3 and the dash wall 18 represent a front section of the passenger compartment P, while the right side of FIG. 3 represents a central section of the passenger compartment P, rearward from the dash wall 18. It should be understood from the drawings and the description herein that the vehicle 10 also includes a variety of conventional components that are peripheral to the invention. Therefore, description of these conventional components is omitted for the sake of brevity.

The instrument panel 20 is preferably mounted to the dash wall 18 such that the instrument panel 20 is at least partially cantilevered from the dash wall 18 within the passenger compartment P, extending rearward above the floor 16. The instrument panel 20 includes a central section 22 (or center stack) and side sections 24, as shown in FIG. 2. As best shown in FIG. 3, the central section 22 of the instrument panel 20 extends rearward from the dash wall 18 a first distance $D_1$ and the side sections 24 of the instrument panel 20 extend rearward a second distance $D_2$. As shown in FIG. 3, the first distance $D_1$ is slightly greater than the second distance $D_2$. Consequently, the instrument panel 20 extends in a rearward direction from the dash wall 18 overhangs the floor 16. Further, as best shown in FIG. 3, the instrument panel 20 extends directly above a forward section of the center console 12.

As shown in FIGS. 1-5, the center console 12 basically includes a main body 30, a pair of kick panels 32 (or stay covers, visible in FIGS. 1-3 only), a storage pocket 34, a shifter panel 36, a compartment cover 38, a rear panel 40, and a pair of the side trim panels 14.

Figure 5:
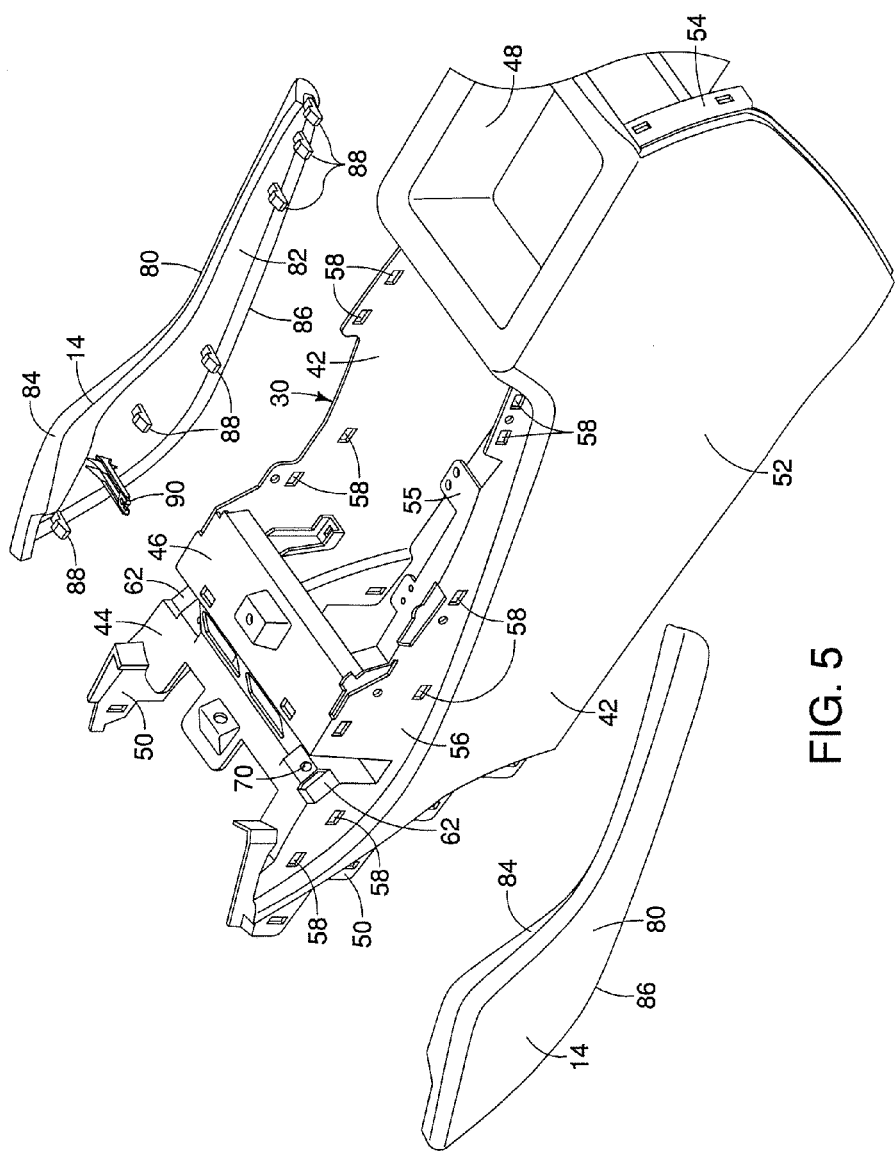
FIG. 5 is an exploded perspective view of portions of the center console showing a main body and the side trim panels of the center console in accordance with one embodiment.
Figure 6:
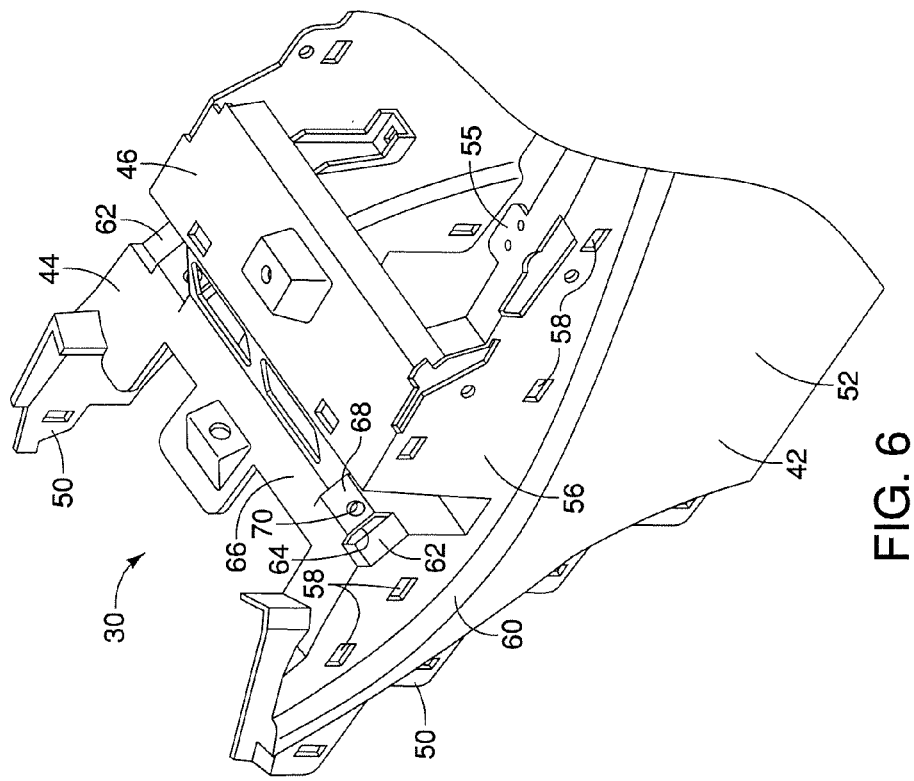
FIG. 6 is another perspective view of the main body of the center console showing one of a pair of side walls of the main body in accordance with one embodiment.

As best shown in FIGS. 5 and 6, the main body 30 is basically a frame that provides structural rigidity for the center console 12. The main body 30 can be made of any of a variety of materials, such as molded plastic, polymers, composite materials, or can be a metallic frame. The main body 30 has a box-like shape with a hollow interior and selected outer surfaces can be covered with decorative materials, such as leather, vinyl, upholstery material, wood, wood veneer, and/or other materials suitable for interior vehicle fixtures.

As best shown in FIGS. 5 and 6, the main body 30 includes side walls 42, a first upper section 44, a second upper section 46 and a compartment section 48. The main body 30 further includes mounting structures (not shown) that receive fasteners (not shown) to fixedly attach the main body 30 to the floor 16 of the vehicle 10 in a conventional manner.

Each of the side walls 42 of the main body 30 includes a front flange 50, a main section 52, a rear flange 54, an upper flange 55 and an upper recessed section 56. The front flange 50 includes a plurality of apertures that receive snap fitting projections (not shown) on the kick panels 32. Hence, after the main body 50 is installed to the floor 16 of the vehicle 10, a portion of the kick panel 32 attaches to the front flange 50 and to structures (not shown) under the instrument panel 20.

The main section 52 is preferably a rigid wall or structure and can include the above mentioned decorative materials. The main section 52 extends from the front flange 50 to the rear flange 54. The rear flange 54 includes a plurality of apertures that receive snap fitting projections (not shown) and/or fastening parts on the rear panel 40, such that the rear panel 40 attaches to the rear flanges 54, as shown fully assembled in FIG. 4. The upper flange 55 also includes a plurality of apertures that receive fasteners and/or snap fitting projections on the storage pocket 34 and the shifter panel 36, such that the storage pocket 34 and the shifter panel 36 attach to the upper flanges 55.

Figure 7:
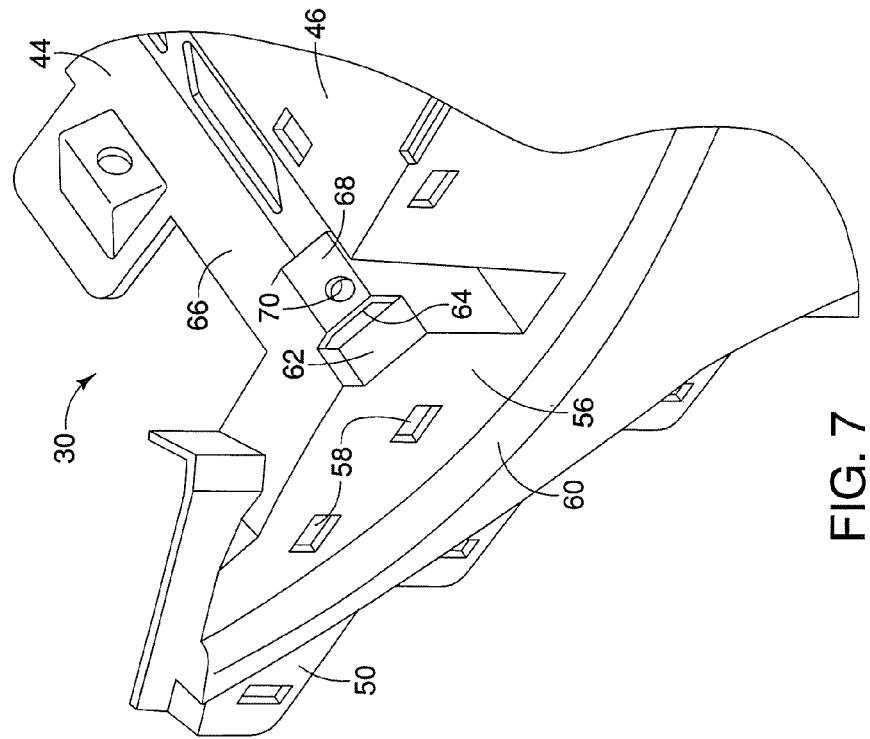
FIG. 7 is another detailed perspective view of the main body of the center console, showing various surfaces that define a slot in the side wall of the main body in accordance with one embodiment.

The upper recessed section 56 of the side wall 42 includes a plurality of apertures 58 (first attachment parts), a contoured lip 60, a mounting ledge 62 and a slot 64 (best shown in FIGS. 6 and 7). The contoured lip 60 has an overall shape that conforms to a lower edge of the side panel 14, as is described in greater detail below. The mounting ledge 62 and the slot 64 are described in greater detail below along with features of the first upper section 44.

Figure 17:
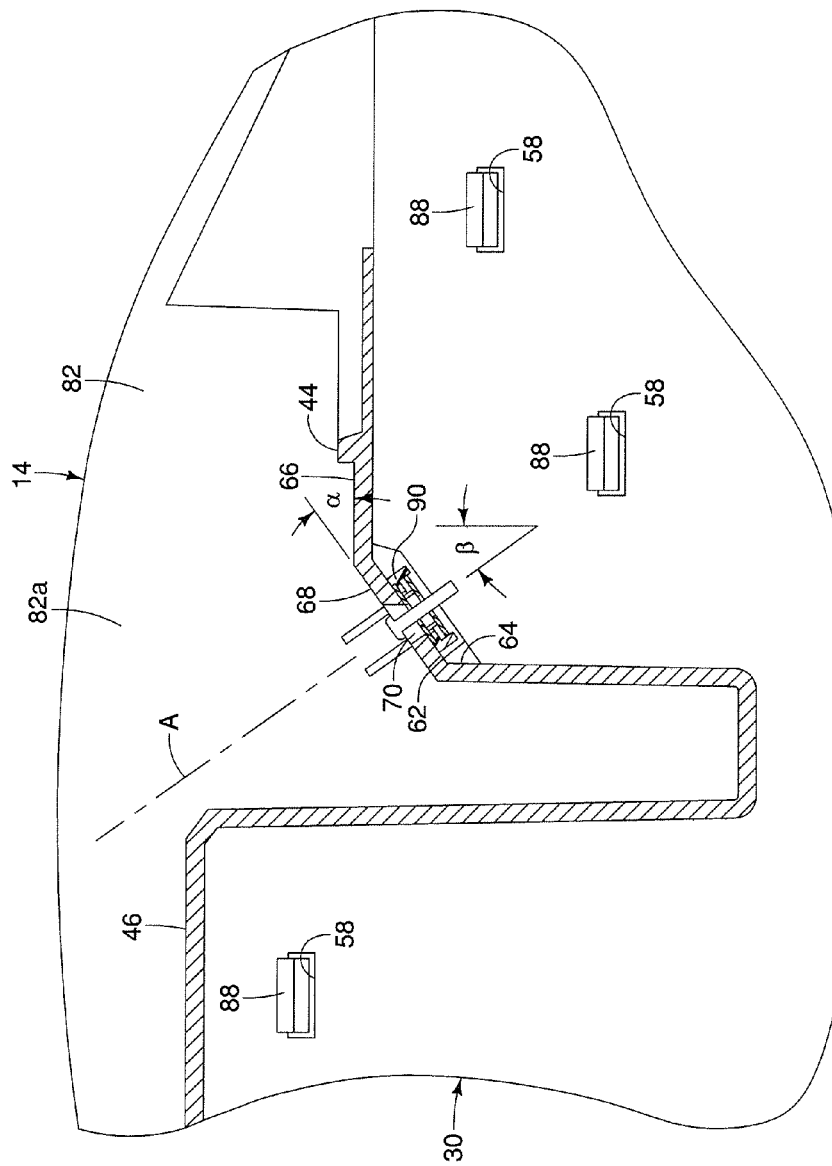
FIG. 17 is a side cross-sectional view of the center console taken along the line 17-17 in FIG. 1, showing the projection of the side trim panel installed in the slot of the main body of the center console in accordance with one embodiment.

As best shown in FIG. 5, the first upper section 44 is basically a cross-member bridging the distance between the side walls 42, and providing support for the storage pocket 34 as well as overall structural rigidity for the main body 30. More specifically, the first upper section 44 extends between forward areas of the side walls 42 coinciding with the upper recessed sections 56. As best shown in FIGS. 7 and 13, the first upper section 44 includes a first surface 66 and a second surface 68. The first surface 66 extends in a direction substantially perpendicular to the upper recessed section 56 of the side wall 42. The first surface 66 also extends in a horizontal direction (with the vehicle 10 being oriented for normal use). As is best shown in FIG. 17, the second surface 68 is a generally upward facing surface that is angularly offset from the first surface 66 by an angle $\alpha$. The angle $\alpha$ is preferably between 35-40 degrees and shown in FIG. 17 as being 38 degrees.

The second surface 68 is also parallel to the mounting ledge 62. Hence, the mounting ledge 62 is likewise inclined by the angle $\alpha$, as shown in FIG. 17. As best shown in FIGS. 6, 7, 13 and 17, the slot 64 is defined in a space between the second surface 68 and the mounting ledge 62. Therefore, the upper and lower peripheral edge portions of the slot 64 are likewise angularly offset by the angle $\alpha$ from a horizontal position. The second surface 68 also defines an aperture 70. The aperture 70 extends through the second surface 68 to an inner cavity of the main body 30 that is accessible through the slot 64. A central axis A of the aperture 70 (FIGS. 13, 17 and 18) extends in a direction substantially parallel to an inner surface of the side trim panel 14. Further, the central axis A of the aperture 70 extends in a direction that is perpendicular to the second surface 68 as shown in FIG. 17. The central axis A of the aperture 70 is angularly offset from a vertical position by an angle $\beta$. The angle $\beta$ is preferably between 50-55 degrees and shown in FIG. 17 as being approximately 52 degrees. Hence, the central axis A of the aperture 70 extends in a direction that is angularly offset from a vertical position away from the instrument panel 20, as shown in FIG. 18.

With reference again to FIGS. 5 and 6, the second upper section 46 is also basically a cross-member bridging the distance between the side walls 42, supporting the shifter panel 36, and generally providing structural rigidity for the main body 30. More specifically, the second upper section 46 extends between forward areas of the side walls 42 coinciding with the upper recessed sections 56. However, the second upper section 46 is spaced further from the front flanges 50 than the first upper section 44. Between the second upper section 46 and the compartment section 48 is an open area covered by the shifter panel 36 (see FIG. 4) such that a transmission control lever 74 extends out of and above the shifter panel 36, with the center console 12 installed to the floor 16 of the vehicle 10.

The compartment section 48 of the main body 30 is a storage area formed with or attached to the main body 30. The compartment cover 38 is fixed to a rear area of the main body 30 via a hinge (not shown) such that the compartment cover 38 can move between a closed position covering the storage area and an open position exposing the storage area of the compartment section, in a conventional manner.

Figure 18:
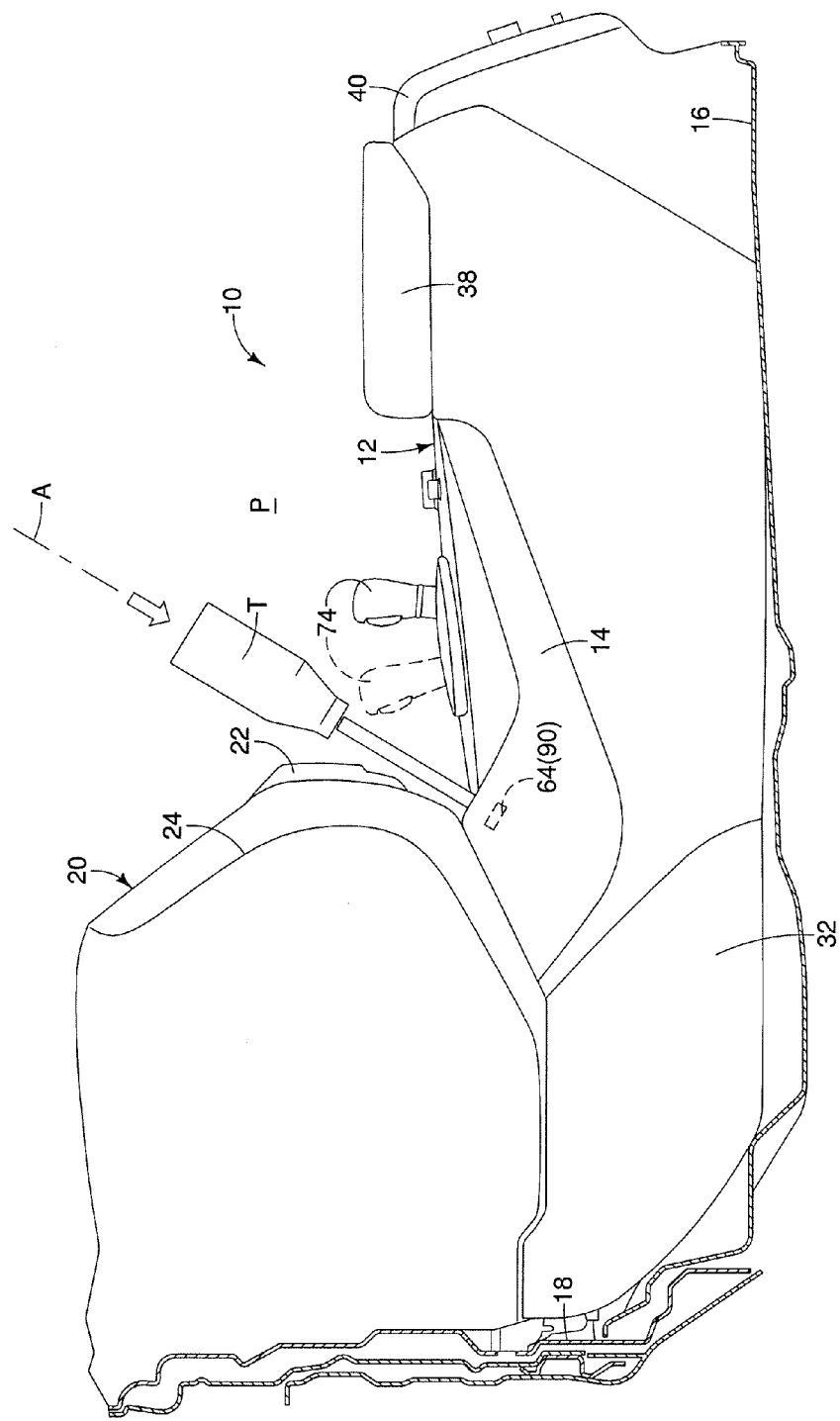
FIG. 18 is a side view of the passenger compartment illustrating an assembly procedure that includes a tool used to tighten the fastener to the fastening clip on the projection in accordance with one embodiment.

As best shown in FIGS. 1-3 and 18, the center console 12 extends from the dash wall 18 rearward along the floor 16 and between the seats S. Further, a front portion of the center console 12 extends forward such that cantilevered central section 22 of the instrument panel 20 at least partially overhangs the center console 12. More specifically, the first upper section 44 and the slot 64 of the main body 30 are at least partially situated beneath the cantilevered central section 22 of the instrument panel 20. The slot 64 is shown in phantom in FIG. 18; clearly illustrating the location of the slot 64 under the instrument panel 20, with the center console 12 installed to the floor 16 if the vehicle 10. Further, a forward section of the side trim panel 14 is located beneath the cantilevered central section 22 of the instrument panel 20, as shown in FIGS. 3 and 18.

A description of the side trim panels 14 is now provided with specific reference to FIGS. 5, 8-12 and 15. There are two side trim panels 14 that are identical to one another, except that they are mirror images of one another. Therefore, description of only one of the side trim panels 14 is provided, but applies equally to both.

As shown in FIGS. 5 and 15, the side trim panel 14 basically includes an flexible outer portion 80 and a rigid inner portion 82, with the flexible outer portion 80 fixedly attached to the rigid inner portion 82. The flexible outer portion 80 can comprise a decorative material, such as leather, vinyl, upholstery material, wood, wood veneer, and/or other materials suitable for interior vehicle fixtures. The rigid inner portion 82 is shaped such that with the flexible outer portion 80 fixed to the inner panel, the side trim panel 14 has an overall fit and finish that conforms to the contoured lip 60 and the upper recessed section 56 of the main body 30.

Specifically, the side trim panel 14 has an upper edge 84 and a lower edge 86. The upper edge 84 is shaped to compliment the center console 12 with an attractive appearance, and therefore can be provided with a variety of shapes and overall contours. The lower edge 86 is shaped to complement the contoured lip 60 such that the side trim panel 14 mates with the upper recessed section 56 of the main body 30.

Figure 8:
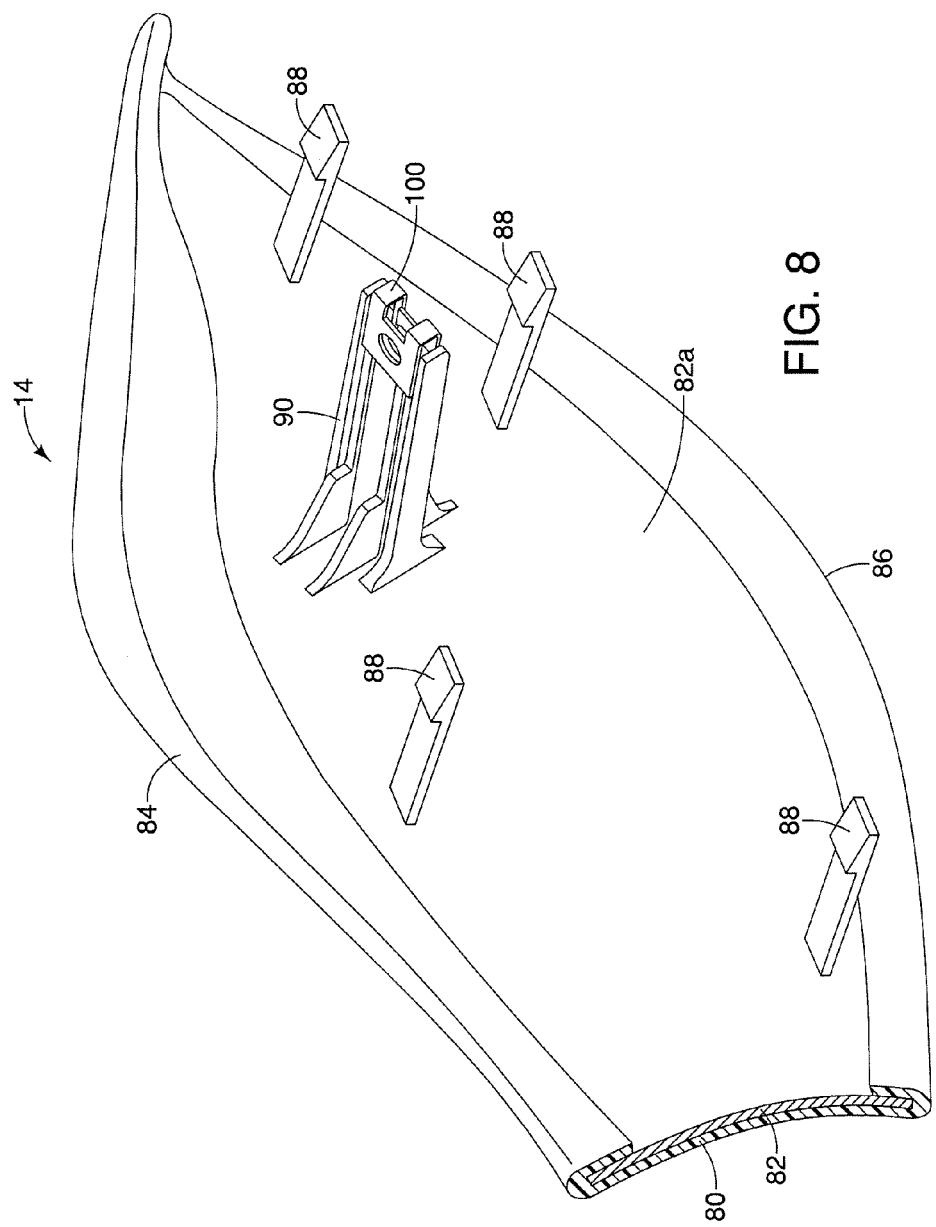
FIG. 8 is a perspective view of the side trim panel removed from the center console, showing a plurality of snap-fitting tabs and a projection extending from a surface thereof in accordance with one embodiment.

As best shown in FIG. 8, the rigid inner portion 82 includes an inner surface 82a from which a plurality of snap-fitting tabs 88 and a projection 90 extend. The snap-fitting tabs 88 and the projection 90 perpendicularly extend away from adjacent areas of the inner surface 82a of the rigid inner portion 82. The snap-fitting tabs 88 (second attachment parts) are positioned and dimensioned to fit into corresponding ones of the apertures 58 (first attachment parts) in the upper recessed section 56 of the side walls 42 of the main body 30 when the side trim panel 14 is installed to the main body 30. Once engaged with peripheral edges of the apertures 58, the snap-fitting tabs 88 partially attach the side trim panel 14 to the main body 30, as indicated in FIG. 18. Acting alone, the snap-fitting tabs 88 releasably secure the side trim panel 14 to the main body 30. However, to further ensure a rigid connection between the side trim panel 14 and the main body 30, the projection 90 provides means for fixedly attaching the side trim panel 14 to the main body 30.

The projection 90, the snap-fitting tabs 88 and the rigid inner portion 82 of the side trim panel 14 are shown integrally formed as a one piece unitary monolithic element. However, the projection 90, the snap-fitting tabs 88, and the rigid inner portion 82 of the side trim panel 14 can all comprise separately formed components that are subsequently attached to one another according to conventional means. More specifically, the projection 90, the snap-fitting tabs 88 and the rigid inner portion 82 can all be formed in a single molding process as an uninterrupted, single molded element. Hence, in the center console 12, the projection 90 of the side trim panel 14, the snap-fitting tabs 88 and the rigid inner portion 82 are preferably made of a molded plastic or polymer material.

As best shown in FIGS. 9-12, the projection 90 includes base ribs 92, side ribs 94, a main section 96 and a distal end having a cutaway section 98. The base ribs 92 have a wide base at the inner surface 82a of the rigid inner portion 82, but have a reduced profile as they extend away from the rigid inner portion 82. The side ribs 94 extend along side edges of the main section 96 and define reinforcing ribs that provide strength and stability for the projection 90. The side ribs 94 extend in a direction substantially perpendicular to the inner surface 82a of the rigid inner portion 82.

The main section 96 is elongated, extending from the inner surface 82a of the rigid inner portion 82 and terminates at the distal end with the cutaway section 98. A peripheral edge of the cutaway section 98 is defined by a semicircular-shaped recess. Since the cutaway section 98 creates an open area at the distal end of the main section 96, the molding process employed to manufacture the rigid inner portion 82 of the side trim panel 14 can be simplified to include a minimal number of mold elements. As the cross-section in FIG. 11 illustrates, the distal end of the main section 96 has a slightly reduced thickness compared a remaining portion of the main section 96.

Further, the projection 90 is provided with a clip-on fastening part or fastening clip 100. The clip 100 has a U-shape when viewed from the side, as shown in FIG. 11. The clip 100 includes a hook or barb 102 and apertures 104. The barb 102 is positioned within the U-shape of the clip 100, such that when the clip 100 is installed to the distal end of the main section 96, the barb 102 hooks onto or digs into portions of the distal end adjacent to the cutaway section 98 of the projection 90. Thus, once installed, the clip 100 resists removal from the projection 90.

Figure 14:
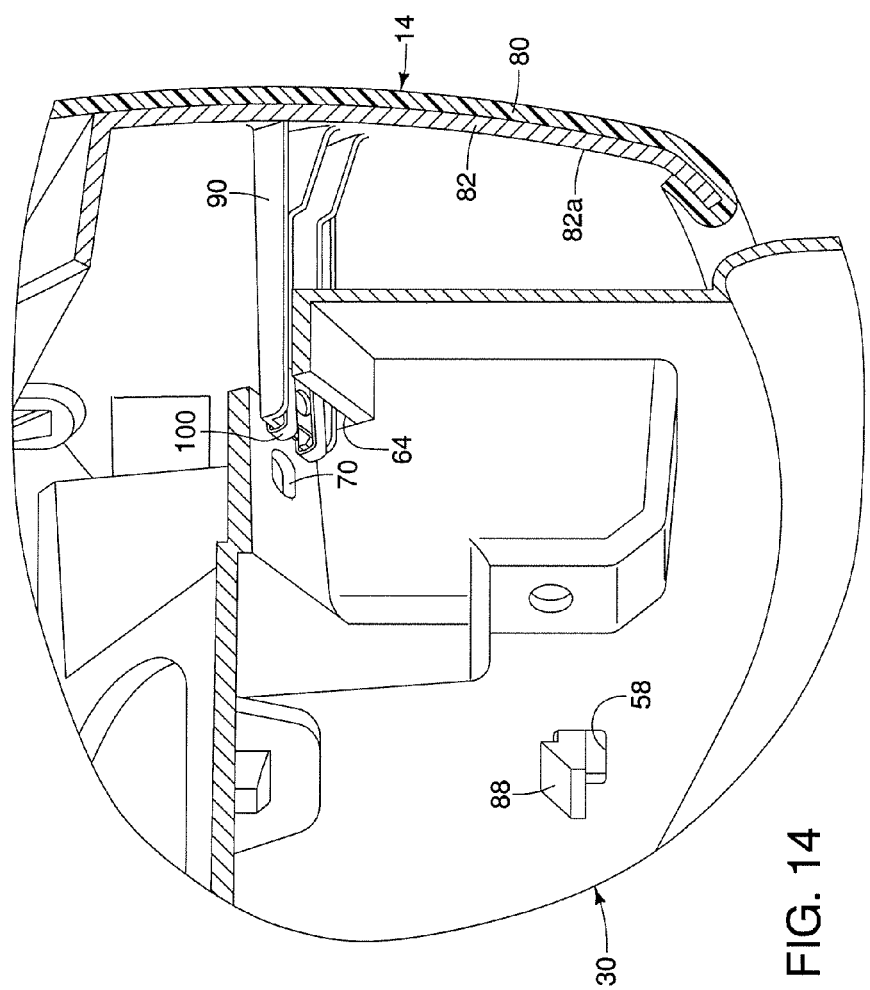
FIG. 14 is a perspective cross-sectional view of the main body and the side trim panel taken along the line 14-14 in FIG. 3, showing the projection partially inserted into the slot of the main body in accordance with one embodiment.

As indicated in FIGS. 13-17, when the side trim panel 14 is installed to the main body 30, the projection 90 (with the clip 100) is inserted into the slot 64 defined through the side wall 42 of the main body 30. For example, as shown in FIG. 13, the projection 90 is first aligned with the slot 64, with the mounting ledge 62 providing a guiding surface against which the projection 90 can slide and ultimately be supported. As shown in FIG. 14, the projection 90 can then slide into the slot 64. As shown in FIGS. 15 and 17, once the projection 90 is fully inserted into the slot 64, a fastener F is passed through the aperture 104 to engage the clip 100. Since the distal end of the projection 90 includes the cutaway section 98, the fastener F fits within the cutaway section 98 as the fastener F extends completely through the clip 100. As shown in FIG. 15, once the fastener F is tightened, the fastener F draws a lower portion of the clip 100 into firm contact with the projection 90. This firmly presses the barb 102 into the surface of the distal end adjacent to the cutaway section 98 of the projection 90. Thus, the clip 100 is firmly and securely engaged with the projection 90 via the barb 102 and the side panel 14 is securely and fixedly attached to the main body 30 of the center console 12.

As shown in FIG. 17, one or more of the snap-fitting tabs 88 can be horizontally oriented. However, the projection 90 is angularly offset from a horizontal position by the angle α for alignment with the slot 64.

As is best shown in FIG. 18, when installed to the floor 16 of the vehicle 10, a forward section of the center console 12 extends under the cantilevered central section 22 of the instrument panel 22 such that the slot 64 and the projection 90 are disposed beneath the central section 22 of the instrument panel 20. Consequently, if the slot 64 and the projection 90 were horizontally oriented, it would be difficult to position an installation tool such as the tool T in order to engage the fastener F. However, since the slot 64 and the projection 90 are angularly offset by the angle α, the tool T can partially extend beneath the central section 22 of the instrument panel 20 and easily align with a head of the fastener F without interference with the instrument panel 20 as shown in FIG. 18.

The vehicle includes a variety of parts, element and components that are conventional components and well known in the art. Since these components are well known in the art, these structures will not be discussed or illustrated in detail herein. Rather, it will be apparent to those skilled in the art from this disclosure that the components can be any type of structure that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle interior assembly. Accordingly, these terms, as utilized to describe the present invention should be interpreted relative to a vehicle equipped with the vehicle interior assembly.

The terms of degree such as "substantially", "about" and "approximately" as used herein allow for a reasonable amount of deviation of the modified property such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle interior assembly comprising:
    a main body having a side surface through which a slot is defined and having a top surface through which a fastener receiving aperture is defined, with the fastener receiving aperture extending through the top surface to an inner cavity of the main body that is accessible through the slot;
    a side trim panel that at least partially covers the side surface of the main body, the side trim panel having a projection that extends away from an inner surface of the side trim panel into the slot defined by the side surface; and
    a fastener part that extends through the fastener receiving aperture defined by the top surface and engages the projection to fixedly couple the side trim panel to the main body.

2. The vehicle interior assembly according to claim 1, wherein
    the projection extends in a direction that is substantially perpendicular to an inner surface of the side trim panel.

3. The vehicle interior assembly according to claim 1, wherein
    the projection includes a pair of reinforcing ribs that at least partially extend along the projection in a direction that is substantially perpendicular to the inner surface of the side trim panel.

4. The vehicle interior assembly according to claim 1, wherein
    a distal end of the projection defines a cutaway section that extends toward the inner surface of the side trim panel from the distal end.

5. The vehicle interior assembly according to claim 4, further comprising
    a fastening clip attached to the distal end of the projection, the fastening clip defining a mounting aperture that is aligned with the cutaway section such that the fastener part contacts a peripheral edge of the mounting aperture and intersects the cutaway section when the fastener part engages the projection.

6. The vehicle interior assembly according to claim 1, wherein
    a central axis of the fastener receiving aperture extends in a direction that is substantially parallel to the inner surface of the side trim panel.

7. The vehicle interior assembly according to claim 1, wherein
    a central axis of the fastener receiving aperture is angularly offset from a vertical orientation.

8. The vehicle interior assembly according to claim 1, wherein
    the side surface and the top surface extend substantially perpendicular to one another.

9. The vehicle interior assembly according to claim 1, further comprising
    an upright dash wall,
    a floor, and
    an instrument panel that extends along the upright dash wall such that the instrument panel is cantilevered relative to the floor, with the main body extending along a portion of the floor such that the slot defined by the side surface and the projection of the side trim panel are at least partially situated beneath an overhang portion of the instrument panel.

10. The vehicle interior assembly according to claim 9, wherein
a central axis of the fastener receiving aperture extends in a direction that is inclined with respect to vertical and rearward relative to the instrument panel.

11. The vehicle interior assembly according to claim 9, wherein
the main body and the side trim panel at least partially define a center console.

12. The vehicle interior assembly according to claim 1, wherein
the main body further includes a mounting ledge that is substantially parallel to a portion of the top surface that defines the fastener receiving aperture and that extends away from a peripheral edge of the slot toward the inner surface of the side trim panel such that the slot is defined in a space between the top surface and the mounting ledge.

13. The vehicle interior assembly according to claim 3, further comprising
a fastening clip attached to the distal end of the projection such that the fastening clip contacts and is seated between the pair of reinforcing ribs.

14. The vehicle interior assembly according to claim 1, further comprising
a fastening clip attached to a distal end portion of the projection, with the distal end portion being defined by a step wall such that the distal end portion has a reduced thickness relative to a remaining portion of the projection and a lateral edge of the fastening clip contacts the step wall.

15. The vehicle interior assembly according to claim 1, wherein
the side surface of the main body includes a plurality of first attachment parts and the side trim panel includes a plurality of second attachment parts configured and arranged to engage the first attachment parts to releasably secure the side trim panel to the main body.

16. The vehicle interior assembly according to claim 15, wherein
each of the first attachment parts includes an aperture and each of the second attachment parts includes a corresponding snap-fitting tab.

17. The vehicle interior assembly according to claim 16, wherein
each of the snap-fitting tabs includes a primary planar surface that is horizontally situated, and the projection includes a primary planar surface that is angularly offset relative to the primary planar surfaces of the snap-fitting tabs about an axis that is perpendicular to the inner surface of the side trim panel.

18. The vehicle interior assembly according to claim 1, wherein
the side trim panel includes a flexible outer portion and a rigid inner portion, with the flexible outer portion being fixedly attached to the rigid inner portion.

19. The vehicle interior assembly according to claim 18, wherein
the projection of the side trim panel is integrally formed with the rigid inner portion as a one piece unitary monolithic element.

20. The vehicle interior assembly according to claim 18, wherein
the projection extends in a direction that is substantially perpendicular to a surface of the rigid inner portion that faces the main body.

\* \* \* \* \*